United States Patent [19]

Kahle

[11] Patent Number: 4,556,406
[45] Date of Patent: Dec. 3, 1985

[54] COMPOUND BEND ROLL FORMING

[75] Inventor: Lisa M. Kahle, Altoona, Pa.

[73] Assignee: PPG Industries, Inc., Pittsburgh, Pa.

[21] Appl. No.: 664,666

[22] Filed: Oct. 25, 1984

[51] Int. Cl.⁴ .................................. C03B 13/16
[52] U.S. Cl. .................................. 65/106; 65/104;
                                   65/107; 65/245; 65/253; 65/273
[58] Field of Search .................. 65/104, 106, 107, 273,
                                              65/268, 245, 253

[56] References Cited

U.S. PATENT DOCUMENTS

| | | | |
|---|---|---|---|
| 3,701,644 | 10/1972 | Frank | 65/106 |
| 3,856,499 | 12/1974 | Frank | 65/104 |
| 3,869,269 | 3/1975 | Knapp | 65/106 |
| 3,881,906 | 5/1975 | Ritter et al. | 65/104 |
| 3,891,420 | 6/1975 | Frank | 65/106 |
| 3,929,441 | 12/1975 | Frank | 65/106 |
| 3,934,996 | 1/1976 | Frank | 65/106 |
| 3,992,181 | 11/1976 | Frank | 65/104 |
| 4,043,783 | 8/1977 | Frank | 65/106 |
| 4,139,359 | 2/1979 | Johnson et al. | 65/107 |
| 4,210,435 | 7/1980 | Claassen | 65/106 |
| 4,218,232 | 8/1980 | Wilhelm | 65/106 |
| 4,290,796 | 9/1981 | Reese et al. | 65/106 X |
| 4,311,509 | 1/1982 | Reader et al. | 65/351 |
| 4,470,835 | 9/1984 | Fecik et al. | 65/106 |

Primary Examiner—Arthur Kellogg
Attorney, Agent, or Firm—Andrew C. Siminerio

[57] ABSTRACT

A roll forming apparatus for shaping heat-softened glass sheets into a configuration having a longitudinal radius of curvature that varies in a direction transverse to the glass sheet. Opposing ends of each forming roll are mounted along continuous arcuate paths defining two different longitudinal radii. Quenching rolls are mounted downstream of the forming rolls with each opposing end mounted along a continuation of the corresponding longitudinal radii.

14 Claims, 15 Drawing Figures

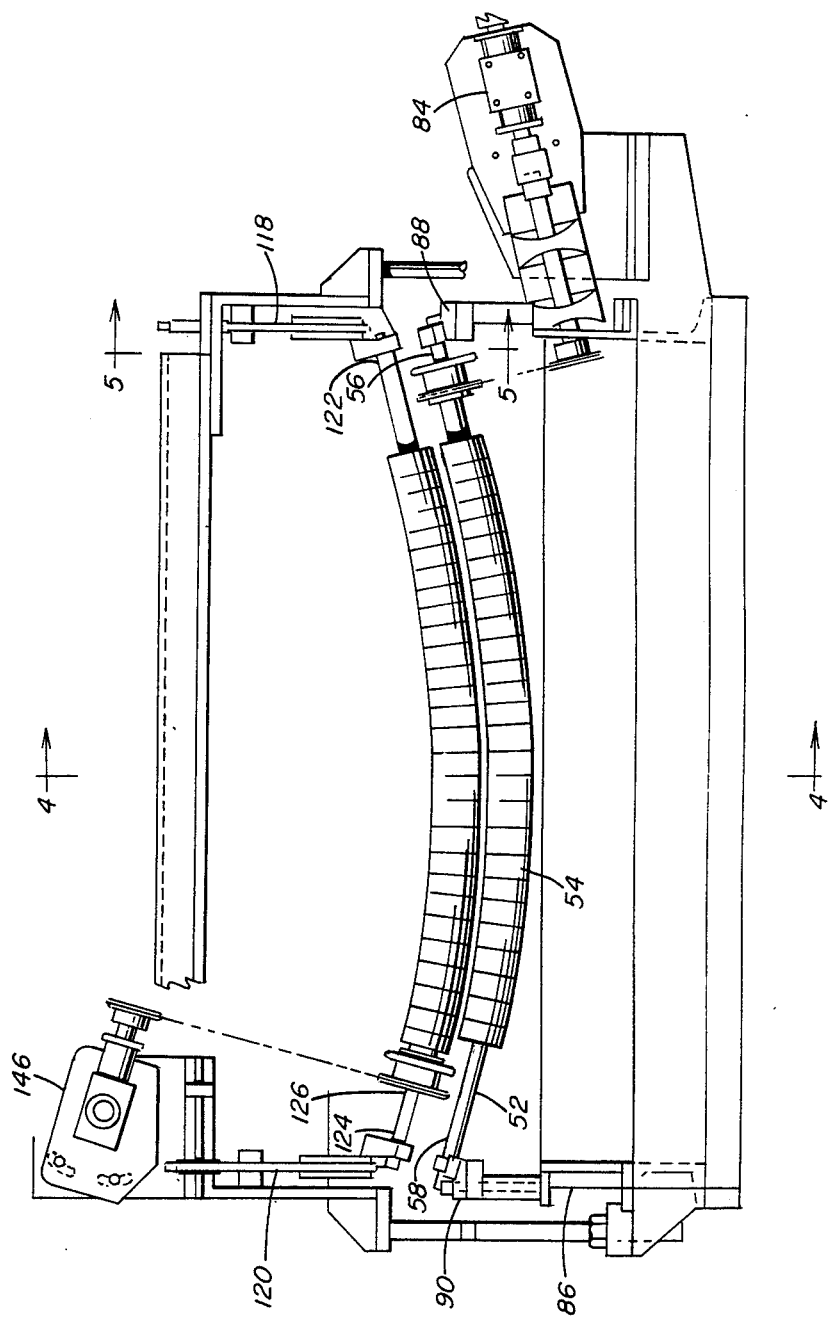

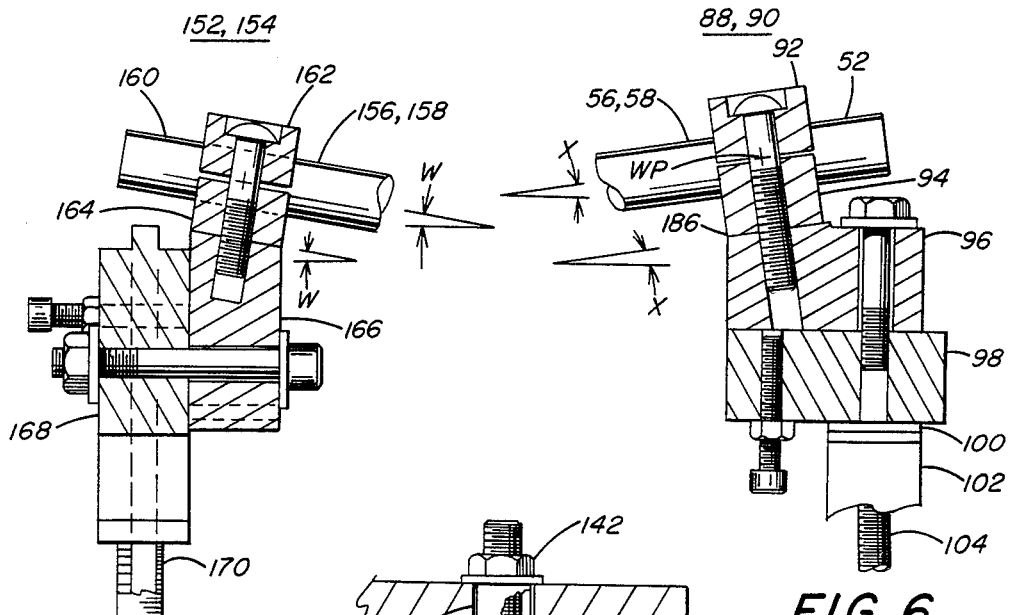
FIG. 9
FIG. 6
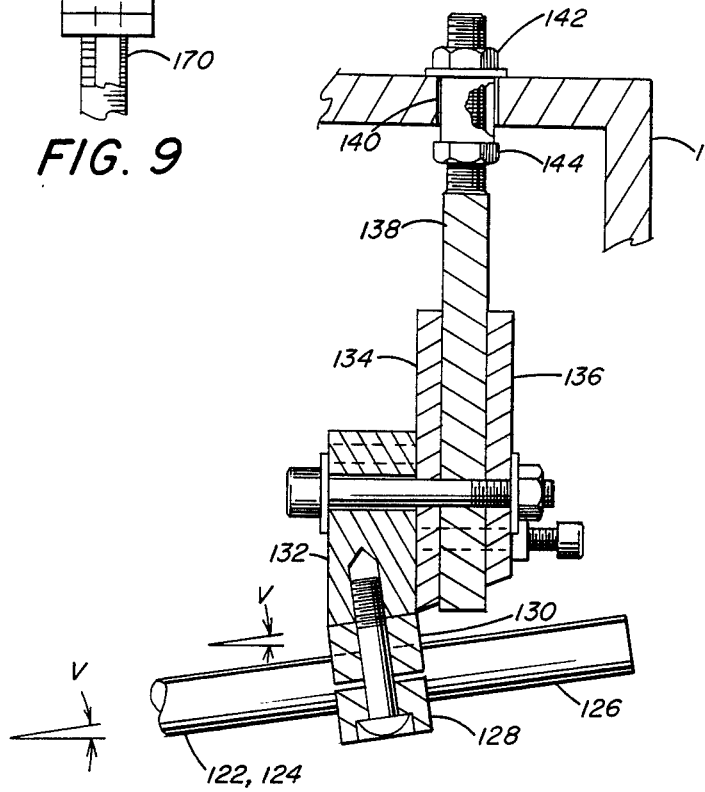
FIG. 7 in # COMPOUND BEND ROLL FORMING

BACKGROUND OF THE INVENTION

I. Field of the Invention

This invention deals with the shaping of heated glass sheets and, more particularly, to forming compound curvatures in glass sheets by roll forming.

II. Discussion of the Technology

Often times in the commercial usage of glass, a glass sheet must be formed in configurations having various curvatures. As used herein, the curvature of glass in its short dimension is referred to as its transverse curvature, while curvature in its longitudinal direction is referred to as its longitudinal curvature. Transverse curvature is measured in a plane passing through the glass in its transverse direction and perpendicular to the glass surface. Longitudinal curvature is measured in a vertical plane along a longitudinal direction of the glass. It follows that if the transverse or longitudinal curvature is constant, the curvature of the glass is essentially along the arc of the circle having a given radius of curvature.

The curvature of a flat glass sheet is manipulated during forming to provide the desired shape and configuration. In roll forming, the glass sheet is deformed by gravity to assume a transverse and/or longitudinal curvature. The transverse curvature is formed by using curved transverse forming rolls. Longitudinal curvature is formed by mounting the individual rolls at the exit end of the heating furnace along a constant longitudinally extending arc. Due to the geometry of the roll forming arrangement, the resulting glass has both a constant transverse curvature in the longitudinal direction of the glass sheet and constant longitudinal curvature in the transverse direction of the glass sheet.

The present invention provides an apparatus and method of forming a glass sheet with a roll forming apparatus so that the glass sheet has a longitudinal radius of curvature that varies in the transverse direction of the glass sheet without replacing the transverse forming rolls.

Presently Available Technology

U.S. Pat. No. 3,881,906 to Ritter, Jr. et al. moves pieces of heated glass over a series of progressively curved rolls of increasing curvature to impart a preliminary bend in the glass. The glass is then conveyed into a shaping station for the desired finish bend where it is lifted vertically and allowed to sag by gravity to the contours of the shaping mold. The resulting glass is straight in its longitudinal direction with the transverse curve.

U.S. Pat. Nos. 3,701,644, 3,856,499, 3,891,420, 3,929,441, 3,934,996, 3,992,181 and 4,043,783 to Frank, and U.S. Pat. No. 3,869,269 to Knapp disclose roll forming apparatuses where discrete glass pieces are pressed between horizontal upper and lower rolls having complementary transverse curvatures. The lower rolls lift the glass off a set of conveying rolls and press the glass against the upper rolls while the glass continues to advance through the shaping station. A varying transverse curvature can be effected by forming the upper and lower rolls to the desired contours. In order to form compound shapes, the upper and lower rolls are positioned along a constant arcuate path in the direction of the glass movement corresponding to the desired shape. Where the glass sheet is heated by a gas hearth with a transversely sloping bed, the shaping station is rotated to correspond with the transverse angle of the glass at the exit end of the furnace.

U.S. Pat. No. 4,139,359 to Johnson et al. shows an apparatus whereby heated glass sheets are shaped while being continuously conveyed by forming rolls having transverse curvature. The force of gravity alone causes the glass sheets to sag into substantial conformity with the transversely curved forming rolls. Support for each glass sheet is gradually transferred from straight conveyor rolls to the curved forming rolls without vertically reciprocating the forming rolls. Compound bends can be formed by positioning the forming rolls on an arcuate path.

U.S. Pat. No. 4,218,232 to Wilhelm shows an apparatus whereby heat-softened glass sheets are conveyed into the forming station on cylindrical rolls. A set of rotating shaping rolls move upward between adjacent cylindrical rolls to engage the lower surface of the moving glass. The glass conforms to the curvature of the shaping rolls as it continues through the forming station.

All the discussed roll forming apparatuses can be used to impart transverse and longitudinal curvatures into a glass sheet. However, there is no teaching therein either implicit or explicit directed towards how to form a glass sheet with a roll forming apparatus so that the glass sheet has a first longitudinal radius of curvature along one longitudinal edge and a different longitudinal radius along its opposite longitudinal edge. It would be advantageous to be able to accomplish such a bend configuration in a roll forming apparatus so as to expand its forming capabilities.

SUMMARY OF THE INVENTION

The present invention provides a roll forming apparatus for shaping heat-softened glass sheets into a configuration having a longitudinal radius of curvature that varies in a direction transverse to the glass sheet. The first end of a first traversing cylindrical roll, and a first and second series of longitudinally spaced and transversely extending forming rolls is mounted so that a longitudinal edge of the glass sheet is positioned along a first continuous arcuate path defining a first longitudinal radius of curvature and a second end of each roll is mounted such that an opposing longitudinal edge of the glass sheet is positioned along a second continuous arcuate path defining a second longitudinal radius of curvature. The first and second longitudinal radii are not equal. A set of upper forming rolls overlay the second series of forming rolls and have a complementary overlying shape. The upper forming rolls are positioned above the second series of forming rolls at a distance slightly greater than the thickness of the glass sheet. Quenching rolls are positioned downstream of the second series of forming rolls with its ends mounted along an extension of the first and second longitudinal radii. Pairs of first and second mounting assemblies maintain the ends of each of the forming rolls at different relative vertical elevations to effect the first and second longitudinal radii. Preferably, the forming rolls and quenching rolls are cylindrical with a concave upward curvature. A series of transversely extending cylindrical conveyor rolls can be alternated with the first series of forming rolls to gradually transfer the heated glass sheet from the conveyor rolls to the first series of forming rolls.

The present invention also provides a method of shaping glass sheets having a longitudinal radius of curvature that varies in a direction transverse to the glass sheet by roll forming. The glass sheets are heated to a softened condition and supported. Incremental, contiguous first and second longitudinal edges of the glass sheet are engaged along a first and second longitudinal radii, respectively, with the radii being unequal. The heat softened glass sheet is allowed to move by force of gravity into substantial conformity with its supports.

BRIEF DESCRIPTION OF THE DRAWINGS

FIG. 3 is a sectional view along lines 3—3 of FIG. 1 showing complementing upper and lower forming rolls.

FIG. 6 is a sectional view along line 6—6 of FIG. 5 showing the lower forming roll mounting assembly.

FIG. 7 is a sectional view along line 7—7 of FIG. 5 showing the upper forming roll mounting assemblies.

FIG. 9 is an enlargement of the quenching roll mounting assembly illustrated in FIG. 8.

DETAILED DESCRIPTION OF THE INVENTION

Figure 1:
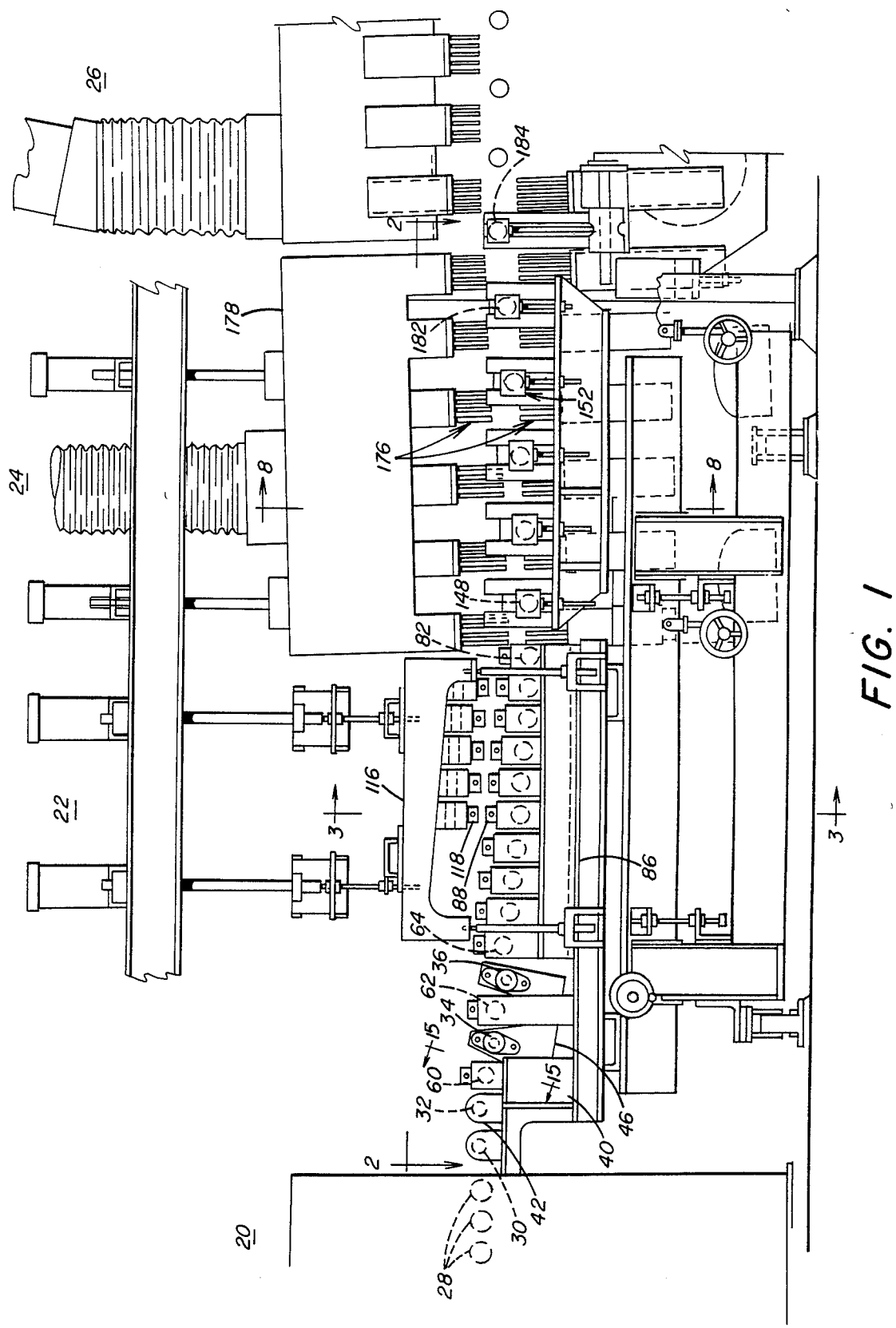
FIG. 1 is a side view of a roll forming apparatus showing a furnace, a roll forming section, a quenching section and a cooling section incorporating features of this invention.

A typical roll forming apparatus as illustrated in FIG. 1 incorporates a glass sheet heating furnace 20 followed by a roll forming section 22, a quenching section 24 and a cooling section 26. The individual components are aligned in a closely spaced end-to-end relationship. U.S. Pat. No. 4,139,359 to Johnson et al. is representative of the current roll forming technology and its teachings are incorporated by reference herein.

The furnace 20 typically heats the glass sheet to a temperature in the range of 1150° F. to 1220° F. (620° C. to 660° C.). Conveying rolls 28 are longitudinally spaced and transversely positioned within the furnace 20 to support and convey the glass sheet. At the end of the furnace 20, the glass sheet is moved into the forming section 22 over transfer roll 30, pivot roll 32 and additional rolls 34 and 36.

Figure 2:
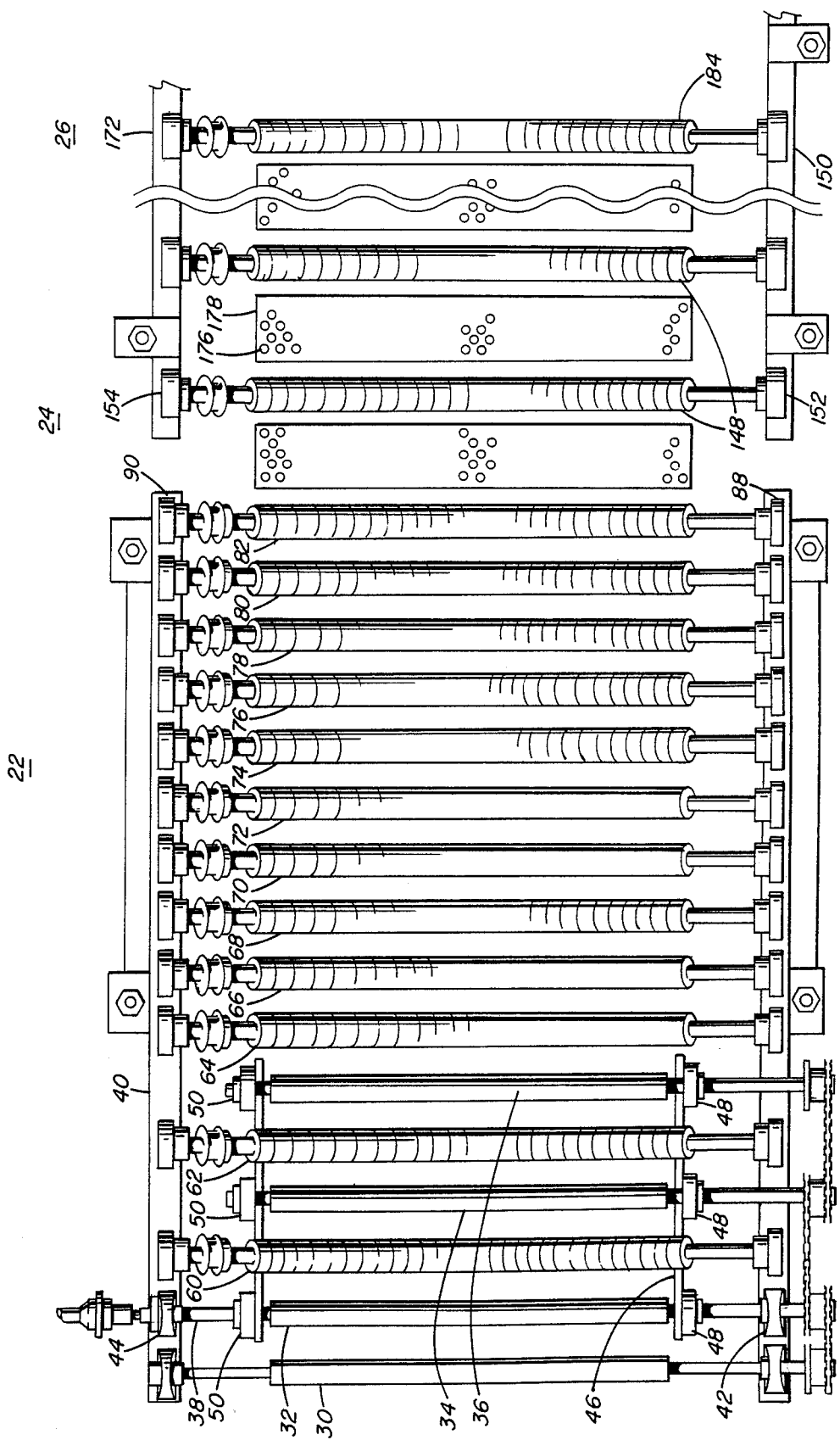
FIG. 2 is a sectional view along lines 2—2 of FIG. 1 showing the upper surfaces of the lower forming rolls and quench rolls.
Figure 5:
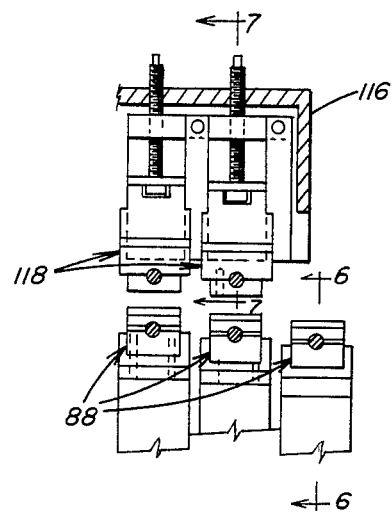
FIG. 5 is a sectional view along line 5—5 of FIG. 3 showing the upper and lower roll forming mounting assemblies.

With specific reference to FIG. 2, pivot roll shaft 38 of pivot roll 32 is rotationally mounted on support frame 40 by bearing housings 42 and 44. The shaft 38 of pivot roll 32 is additionally mounted, as well as rolls 34 and 36, on pivoting frame 46 by bearing housings 48 and 50 such that the rolls 34 and 36 rotate in unison on the frame 46 about a horizontal axis defined by the pivot roll 32. In its operating position the pivoting frame 46 is pivoted into an obliquely downward position as depicted in FIG. 1. The pivot roll 32 and additional rolls 34 and 36 are interconnected by a common drive means (not shown) so that they rotate in unison on the frame 46. The rolls 28, 30, 32, 34 and 36 are preferably cylindrical rolls.

The roll forming section 22 includes a plurality of forming rolls. Although not limited to the present invention, the forming rolls are preferably as illustrated in FIGS. 2 and 3 and taught in U.S. Pat. No. 4,311,509 to Reader et al. The teachings of U.S. Pat. No. 4,311,509 are incorporated by reference herein. With specific reference to FIG. 3, the forming rolls have a shaft 52 conforming to a concave upward curvature transverse to the path of the glass defined by the rolls 32, 34 and 36. A plurality of interconnected cylindrical hubs 54 are mounted on the shaft 52 such that when the shaft 52 rotates, the hubs 54 also rotate in unison with the shaft 52. End portions 56 and 58 of the shaft 52 are straight shaft sections. Each shaft 52 of forming rolls 60 through 82 is driven by a common drive means 84 and rotates in unison. The shaft 52 is mounted on rigid frame 86 by mounting assemblies 88 and 90 in a manner illustrated in FIGS. 1 and 6 and extends through clamps 92 and 94 which are bolted to roll support block 96. The block 96 is bolted to top block 98 which, in turn, is mounted on shim set 100 and spacer 102 and connected to the frame 86 by adjusting screw 104. Frame 86 is provided with aligned apertures to receive the adjusting screw 104. Successive lower forming rolls 60, 62, 64, 66, 68, 70, 72, 74, 76, 78, 80 and 82 are arranged in spaced relation downstream of one another and mounted on the frame 86 in a similar manner. The mounting assemblies 88 and 90 supporting the shafts 52 of the lower forming rolls 60 through 82 are mounted on the frame 86 along a smooth, arcuate path of a radius related to the longitudinal curvature of the longitudinal edges of the glass sheet to be shaped. Although not limited to this invention, the transverse curvation is the same for each of the lower forming rolls 60 through 82. The practice of determining the elevation of successive mounting assemblies so as to position the assemblies along a longitudinal radius is known in the art and is not discussed further. The rolls 34 and 36 are disposed approximately midway between the adjacent lower forming rolls 60, 62 and 64 as shown in FIG. 1.

Figure 4:
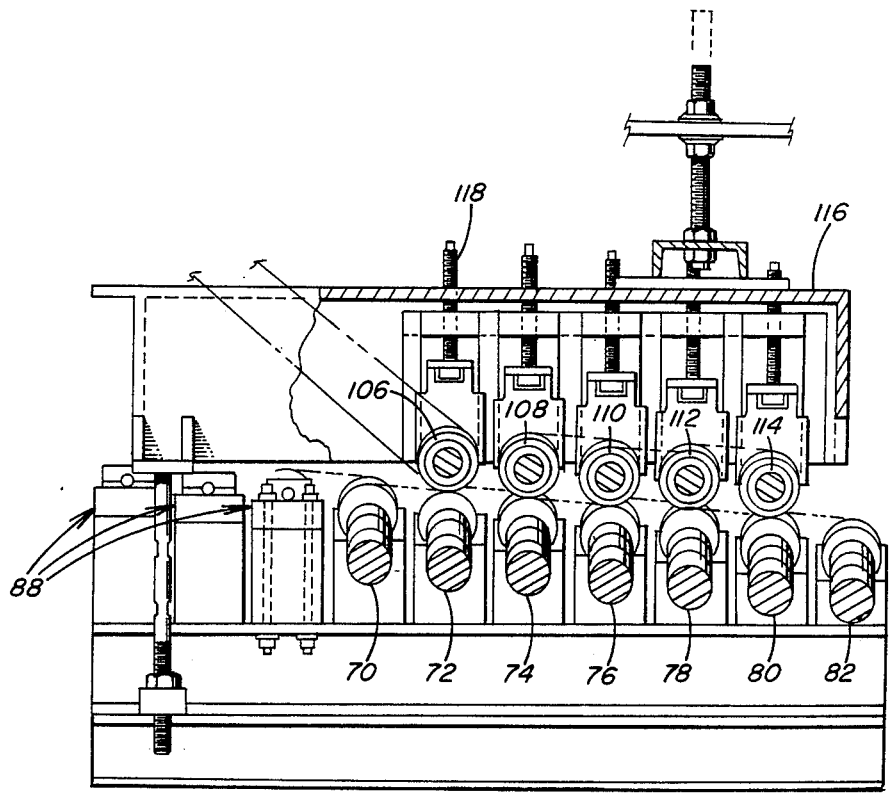
FIG. 4 is a sectional view along line 4—4 of FIG. 3 showing the upper and lower forming rolls.

Referring to FIGS. 1 and 4, the forming section 22 has an additional set of upper forming rolls 106, 108, 110, 112 and 114, similar in design to the lower forming rolls 60 through 82 and supported from frame 116 by mounting assemblies 118 and 120. As illustrated in FIG. 7, end portions 122 and 124 of shaft 126 of the upper rolls extend through top clamps 128 and 130 which are connected to a top roll support block 132. The block 132 is connected to plates 134 and 136 which are secured to threaded adjuster 138. Threaded sleeve 140 and lock nuts 142 and 144 are threaded onto the threaded adjuster 138 for vertical adjustment of the shaft end portions 122 and 124. The upper frame 116 has aligned aperture to receive threaded adjuster 138 and sleeve 140. The mounting assemblies 118 and 120 support the upper forming rolls 106, 108, 110, 112 and 114 directly over the corresponding lower forming rolls 72, 74, 76, 78 and 80, respectively, and are adjusted so that the lower surface of each upper forming roll is at a uniformly spaced relation above the upper surface of a corresponding lower forming roll. As a result, the transverse curvature of the upper forming rolls 106 through 114 is slightly sharper than the transverse curvature of the corresponding lower forming rolls 72 through 80. This spaced relation is slightly more than the thickness of the sheet of glass passing therethrough. The upper forming rolls 106 through 114 are driven by a common drive means 146.

The driving mechanism for rotating the forming rolls in unison is well known in the art and not discussed further.

In forming the glass sheet, the purpose of the pivot roll 32 and additional rolls 34 and 36 is to incrementally transfer the glass from the cylindrical rolls 32, 34 and 36 to the curved lower forming rolls 60 through 64 as taught in U.S. Pat. No. 4,139,359 to Johnson et al. It is understood that the number of cylindrical rolls, lower forming rolls and upper forming rolls, in the roll forming section 22, is exemplary, and these numbers may increase and decrease as required. In addition, rolls 34 and 36, could be eliminated and replaced with curved forming rolls without affecting the basic roll forming principle.

After passing through the forming section 22, the glass sheet is conveyed on quenching rolls 148 through the quenching section 24 as illustrated in FIGS. 1 and 2. The rolls 148 are similar in design and have the same transverse curvature as the lower forming rolls 60 through 82 and support the shaped glass sheet during quenching. The rolls 148 are mounted on quenching frame 150 by mounting assemblies 152 and 154 along a continuation of the curved path provided by the mounting assemblies 88 and 90 of the forming rolls 60 through 82. This arcuate path continues uninterrupted through the quench section 24 until such time that the glass sheet is cooled and sufficiently rigid to retain its curved configuration when conveyed along a horizontal path. As illustrated in FIG. 9, shaft end portions 156 and 158 of shaft 160 of the rolls 148 extend through clamps 162 and 164 which are connected to support block 166. The support block 166 is bolted to slide block 168 which is mounted on adjusting screw 170. The quench frame 150 has support rails 172 and 174 with aligned apertures to receive the adjusting screws 170.

Figure 8:
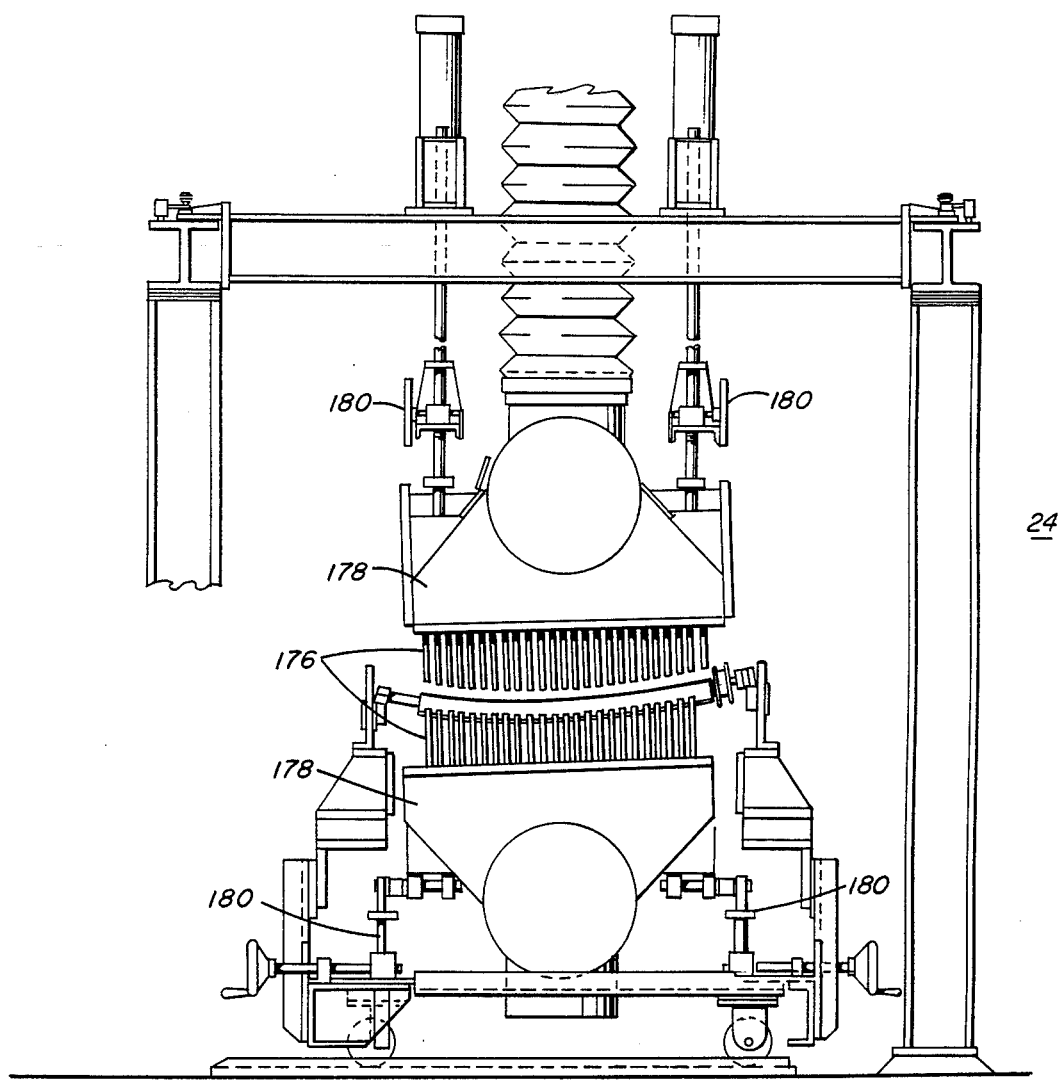
FIG. 8 is a sectional view along line 8—8 of FIG. 1 showing the quenching section.

With reference to FIG. 8, the quenching section 24 includes nozzles 176 interspaced between the rolls 148 above and below the glass sheet. The nozzles 176 extend from the air plenum 178 and form an arc having a radius of curvature approximating the transverse curvature of the glass sheet. Successive nozzle 176 and air plenum 178 assemblies are positioned along a longitudinal path approximating the curved path of the glass sheet through the quench section 24. Adjusting means 180 on the air plenums 178 allows each end of the air plenums 178 to be vertically adjusted to conform with the longitudinal and transverse curvature of the glass sheet and to facilitate repair and maintenance work. Such adjusting means are well known in the art and they are not discussed further.

The glass sheet exits the quench section 24 and into the cooling section 26 where cooling continues until the glass can be handled for additional operation.

It is common practice in roll forming operations to have the same longitudinal radius of curvature along both longitudinal edges of the glass sheet. This is accomplished by maintaining the mounting assemblies for each individual forming roll at the same elevation along the desired arcuate curve.

Figure 11:
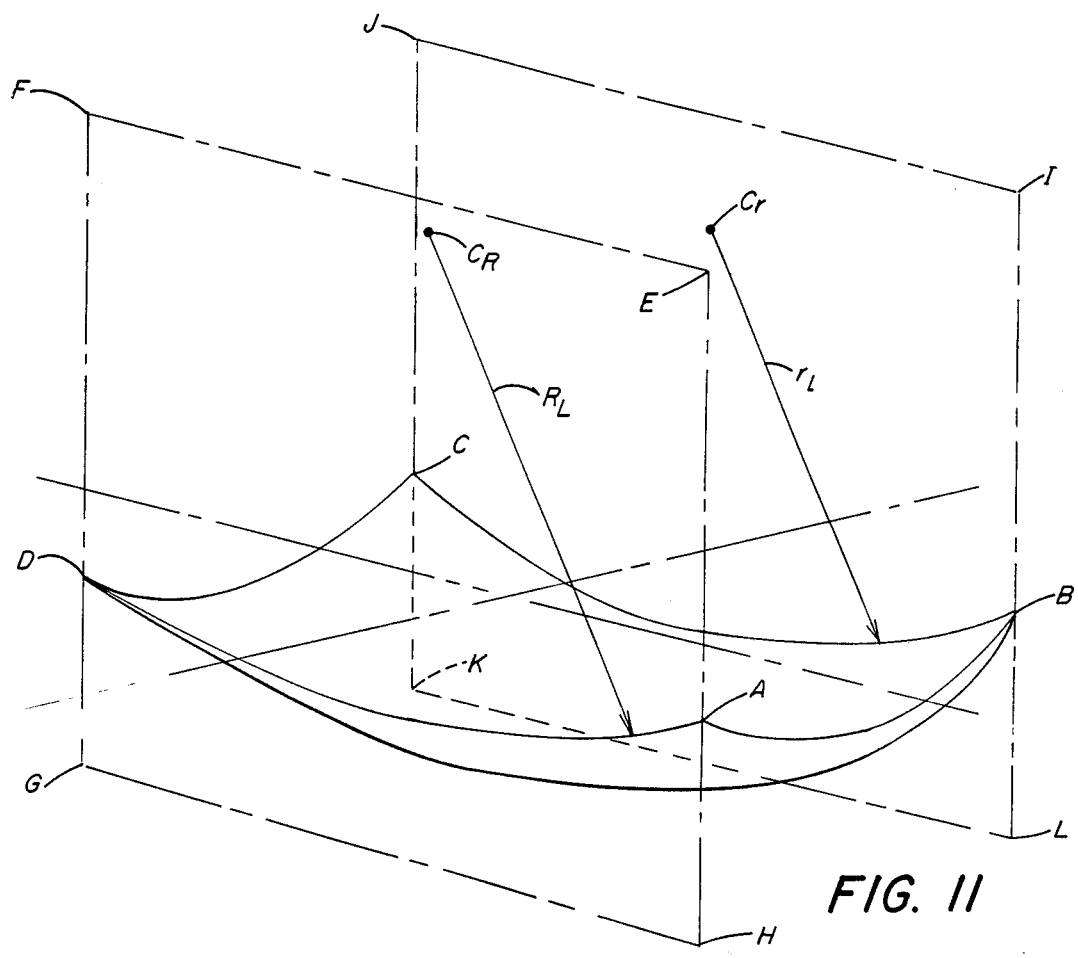
FIG. 11 is an isometric projection of the formed glass sheet showing different radii along its opposing longitudinal edges.
Figure 10:
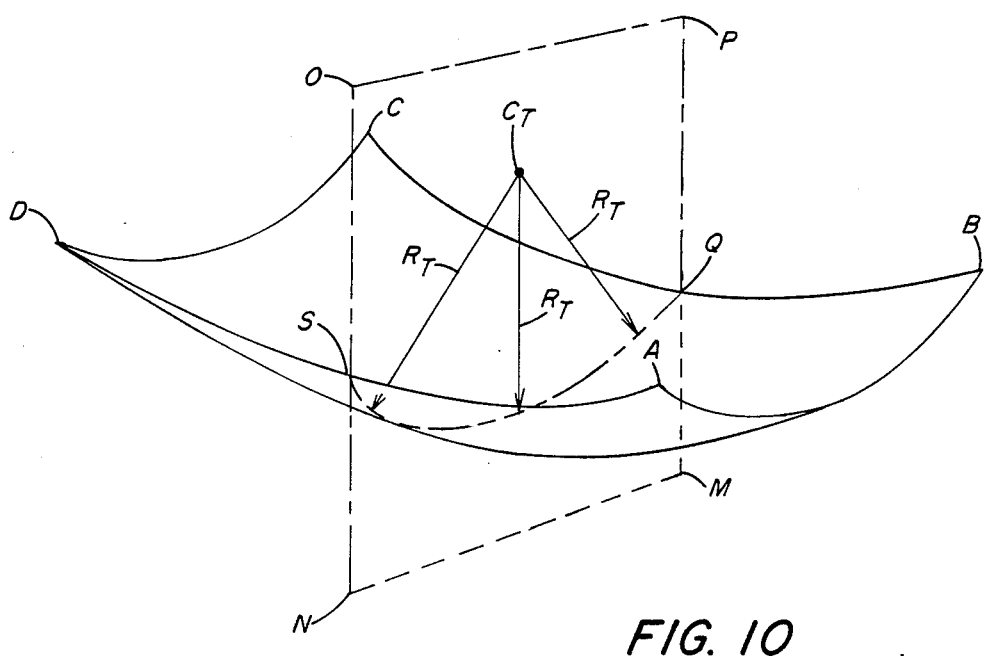
FIG. 10 is an isometric projection of the formed glass sheet showing its constant transverse radius of curvature.

As illustrated in FIGS. 10 and 11, glass sheet ABCD as formed in accordance with this invention has a constant transverse radius of curvature along the length of the glass sheet, a first longitudinal radius of curvature along one longitudinal edge of the glass, and a second longitudinal radius of curvature along the opposite longitudinal edge, with the longitudinal radius varying uniformly between each edge. FIG. 10 illustrates the transverse radius of curvature at a point along the glass sheet. Plane MNOP is perpendicular to and intersects glass sheet ABCD along curved line SQ. The radius of curvature, $R_T$, is constant about the center of curvature, $C_T$. Since all the forming rolls have the same configuration and the same transverse radius of curvature, the glass sheet formed by passing through the forming section 22 will have a transverse radius of curvature that is constant about an axis formed by the center of curvature of each of the forming rolls.

FIG. 11 illustrates the varying longitudinal radius of curvature in glass sheet ABCD. Longitudinal edge AD of glass sheet ABCD is in vertical plane EFGH and has a longitudinal radius of curvature $R_L$ about center of curvature $C_R$. Opposing longitudinal edge BC is in vertical plane IJKL and has a longitudinal radius of curvature $r_L$ about center of curvature $C_r$. As illustrated, $R_L$ is not equal to $r_L$.

Figure 12:
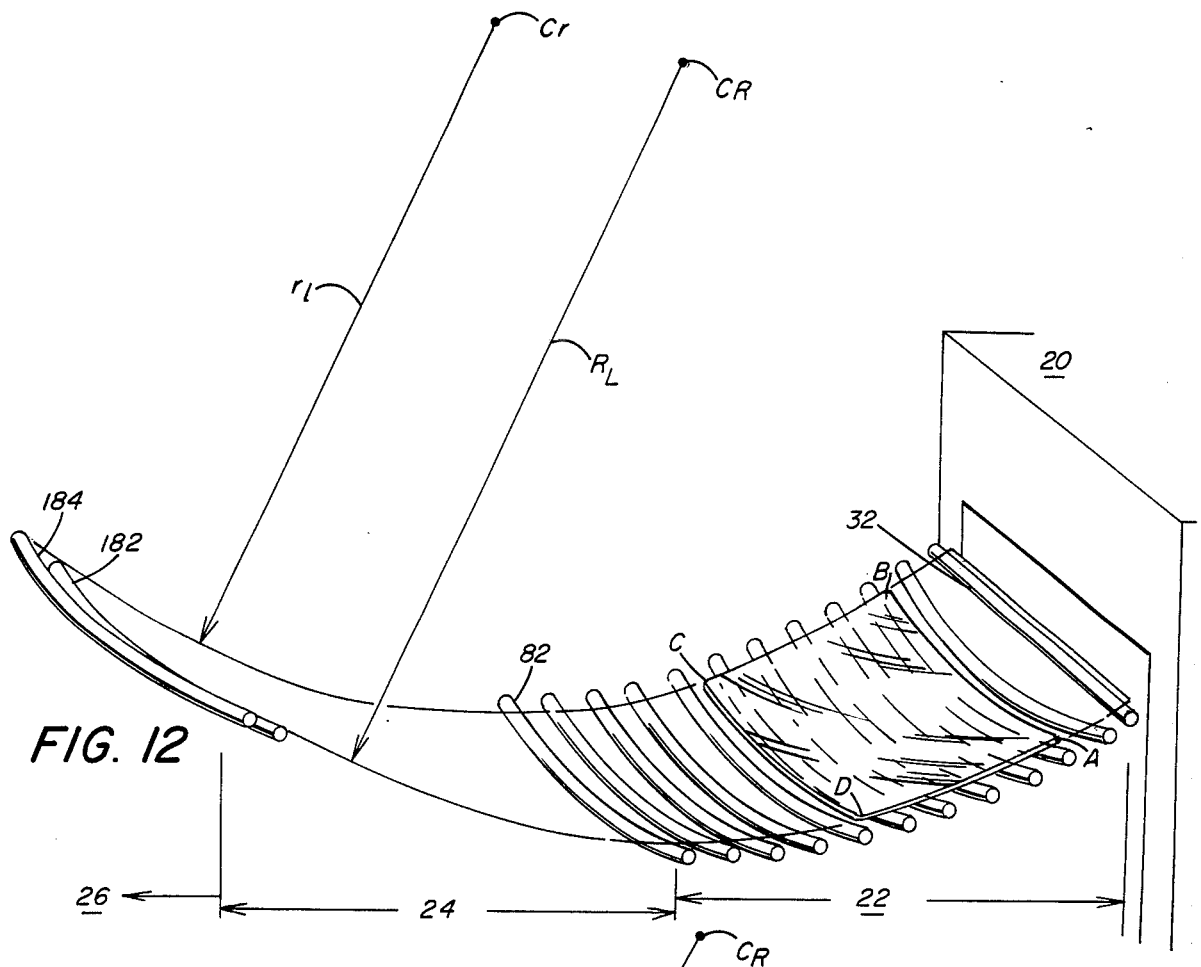
FIG. 12 is an isometric schematic showing the positioning of the forming rolls along two different longitudinal radius of curvatures.
Figure 13:
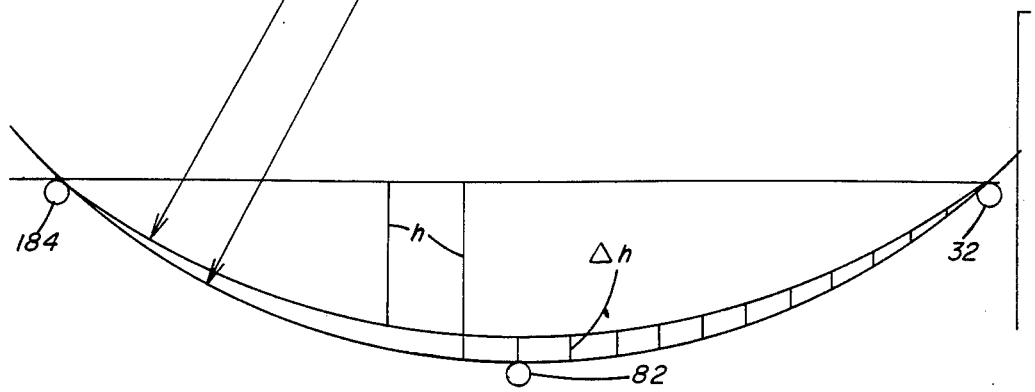
FIG. 13 is a schematic view, superimposing the longitudinal radii of curvatures along the opposing longitudinal edges of the glass sheet.

In order to manufacture glass sheet ABCD in the preferred configuration, longitudinal edge AD and BC must be positioned along different longitudinal radii. FIGS. 12 and 13 schematically illustrate the location of the longitudinal radii $R_L$ and $r_L$ along edges AD and BC of the glass sheet ABCD relative to the furnace 20, the roll forming section 22 and the quench section 24. Glass sheet ABCD exits the furnace 20 in a horizontal orientation and enters the roll forming section 22 over the pivot roll 32. The glass sheet ABCD exits the quench section 24 over last quench roll 182 and onto cooling roll 184 of the cooling section 26. In the preferred embodiment the cooling roll 184 is a curved roll similar to the lower forming rolls. The forming and quenching of glass sheet ABCD occurs between the rolls 32 and 184. Both radii $R_L$ and $r_L$ pass through the conveying surfaces of the rolls 32 and 184 as well as the rolls positioned therebetween, at the edges AD and BC of the glass sheet ABCD as illustrated. FIG. 13 shows, in exaggerated form for clarity, the difference in elevation, $\Delta h$, between each forming roll at corresponding opposing edge portions of the glass sheet ABCD along the arcuate path of each longitudinal radius.

For illustrative purposes, the adjustment of the forming rolls 60 to 82 will be discussed. Adjustment to the upper rolls 106 to 114 and quench rolls 148 will become apparent in light of the following discussion.

In order to effect a different longitudinal radius of curvature along each longitudinal edge of glass sheet ABCD, the portions of the forming rolls at the edges AD and BC of the glass sheet ABCD must be positioned along the radii $R_L$ and $r_L$, respectively. This in turn requires the mounting assemblies 88 and 90 to be mounted along longitudinal radii that will produce the radii $R_L$ and $r_L$. Since the assemblies 88 and 90 are positioned outboard of the glass edges AD and BC, respectively, the longitudinal radius along which the mounting assemblies 88 are mounted is slightly greater than $R_L$, and the longitudinal radius along which the mounting assemblies 90 are mounted is slightly smaller than $r_L$. In order to effect these different radii, the mounting assemblies 88 and 90 of the lower forming rolls 60 through 82 are raised or lowered relative to each other. As shown in FIG. 6, work point, WP, represents the midpoint along shaft end portions 56 and 58 of the shaft 52 of the forming rolls as it passes through the center of the clamps 92 and 94 of the assemblies 88 and 90. Each shaft end portion 56 and 58 is inclined at an angle "X" in the assemblies 88 and 90, respectively. Angle "X" is the same for both assemblies 88 and 90 when $R_L$ equals $r_L$. In the preferred embodiment, the interfacial surface 186, between the clamp 94 and roll support block 96 is parallel to shaft section 56 or 58 and inclined at the same angle.

Figure 14:
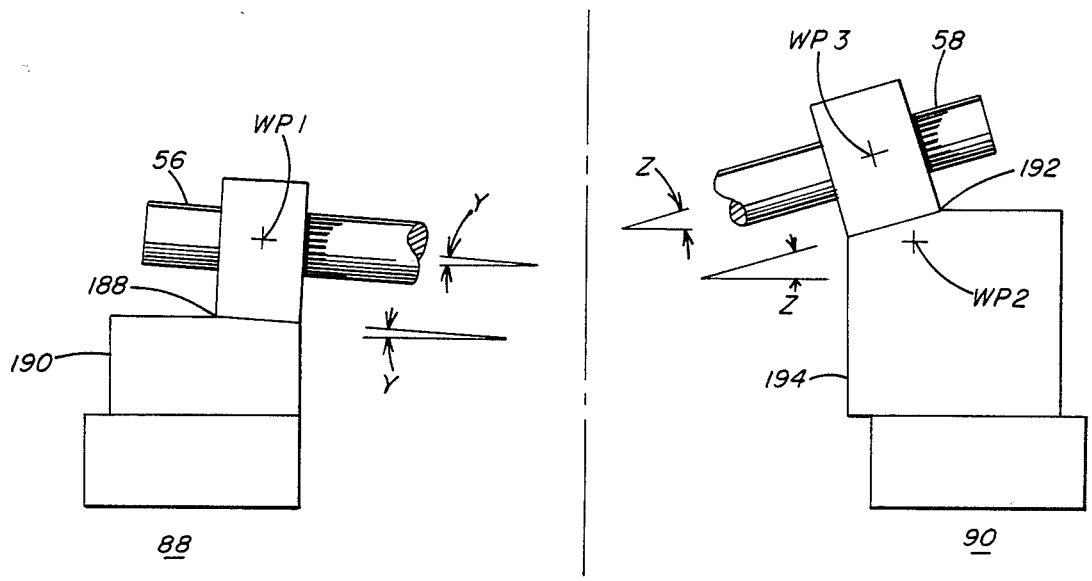
FIG. 14 is a schematic cross-sectional view showing the mounting assemblies for the forming rolls with portions removed for clarity.

In order to produce a first longitudinal radius of curvature, $R_L$, along longitudinal edge AD of the glass sheet ABCD, while effecting a second longitudinal radius of curvature, $r_L$, along the opposite longitudinal edge BC, the forming rolls are preferably pivoted relative to their position when $R_L$ is equal to $r_L$. Although not limited in this invention, the rolls are preferably pivoted about one of the work points, WP. FIG. 14 illustrates the mounting assemblies in their pivoted orientation. WP1 of the mounting assembly 88 remains as originally located as when $R_L$ equals $r_L$, although shaft end portion 56 pivots, while WP2 of assembly 90 moves to WP3. In viewing this rotation it is noted that in moving from WP2 to WP3 there is both a lateral and vertical displacement. In addition, angle "X" which is the same for both of the assemblies 88 and 90 when $R_L$ equals $r_L$ along the glass sheet edges AD and BC, changes due to rotation of the forming rolls. The shaft end portion 56 in the mounting assembly 88 is rotated to an angle "Y" and shaft end portion 58 in the assembly 90 is rotated to an angle "Z". While the roll support block 96 has the same configuration in the assemblies 88 and 90 when $R_L$ equals $r_L$, it changes when the radii are not equal. In order to avoid torquing or twisting of shaft end portions 56 and 58 due to non-alignment of these shafts within clamps 92 and 94, interfacial surface 188 of roll support block 190 in the assembly 88 is inclined at angle "Y" and interfacial surface 192 of roll support block 194 in the assembly 90 is inclined at angle "Z". Angle "Y" equals angle "X" less the angle of rotation of the forming roll while angle "Z" equals angle "X" plus the angle of rotation of the forming roll. In addition, the roll support block 194 is sized to accommodate the lateral and vertical displacement of the work point from WP2 to WP3.

As an alternative, gross vertical movement of the roll support block 96 can be adjusted via the adjusting screw 104. In such a case, the roll support block 194 would only have to be sized to accommodate all the lateral displacement of WP2 to WP3 and only a small portion of the vertical displacement. In either configuration, the interfacial surface 192 is still preferably machined to maintain the same angle "Z" as shaft end portion 58.

From the previous discussion it is apparent how the mounting assemblies 118, 120, 152 and 154 can be adjusted to continue the different longitudinal radius of curvatures established by adjusting the mounting assemblies 88 and 90 of the forming rolls 60 through 82 so as to maintain radii $R_L$ and $r_L$ along the glass sheet edge AD and BC, respectively. In the mounting assemblies 118 and 120, the top roll support block 132 can be modified to accommodate the pivoting of top forming rolls 106 through 114. Gross vertical adjustment can be made turning the threaded sleeve 140 on the adjuster 138 and locking it in place with the lock nuts 142 and 144. In the mounting assemblies 152 and 154, the support block 166 is adjusted to accommodate pivoting of the quench rolls 148. Gross vertical adjustment can be made via the adjusting screw 170.

It should be noted that shaft portions 122 and 124 of the upper forming rolls 106 through 114 extend through the mounting assemblies 118 and 120, respectively, at an angle "V" and shaft portions 156 and 158 of the quench rolls 148 extend through the mounting assemblies 152 and 154, respectively, at an angle "W". Although not limited to this invention, in the preferred embodiment angles "V", "W" and "X" are equal when $R_L$ equals $r_L$. In the alternative, angles "V" and "W" could differ from angle "X" depending on the geometry of the roll and end portion of the shaft. For example, if the upper conveying surface of the upper forming rolls 106 through 114 was the same length as the upper conveying surface of the lower forming rolls 72 through 80, since the upper conveying roll 106 through 114 have a sharper transverse radius of curvature, the angle "V" of shaft portions 122 and 124 will be different from angle "X" of shaft portions 56 and 58.

In addition to adjusting the forming and quenching rolls, the nozzles 176 and air plenums 178 are adjusted by the adjusting means 180 to roughly accommodate the different longitudinal radius of curvature along a length of the glass sheet as it passes through the quench section 24. To minimize the amount of adjustment required by the nozzle 176 and air plenum 178 assemblies during a pattern change, the preferred embodiment of this invention has the maximum elevation difference between corresponding opposing portions of edges AD and BC (and thus the corresponding mounting assemblies 88 and 90) at the last forming roll 82 prior to entering the quench. As shown in FIG. 13, the elevation differential Δh between the corresponding opposing edge portions increases from the pivot roll 32 to the forming roll 82 and decreases from the forming roll 82 through the quench section 24 to the exit at which point the edge portions (and the corresponding mounting assemblies 152 and 154) at the cooling roll 184 are at the same elevation. To effect this configuration, the pivot roll 32 and cooling roll 184 are set a predetermined distance apart. The pivot roll 32 is positioned horizontal and level with conveying rolls 28. The roll 184 is positioned relative to the pivot roll 32 such that the portions of the roll 184 which support the glass sheet ABCD at its edges AD and BC are level with the pivot roll 32. The forming section 22 is located in one half of this forming and quenching zone and the quench section 24 is positioned in the other half.

TABLE 1

| | Elevation Differentials for Forming Rolls at Glass Sheet Edges AD and BC | | |
|---|---|---|---|
| | Sag, h, (inches) | | |
| Position | for 3600 in. Radius Edge AD | for 1800 in. Radius Edge BC | Δh (inches) |
| AA (Roll 32) | 0 | 0 | 0 |

TABLE 1-continued

Elevation Differentials for Forming Rolls at Glass Sheet Edges AD and BC

| Position | Sag, h, (inches) | | Δh (inches) |
|---|---|---|---|
| | for 3600 in. Radius Edge AD | for 1800 in. Radius Edge BC | |
| BB | 0.98 | 1.96 | 0.98 |
| CC | 1.79 | 3.58 | 1.79 |
| DD | 2.14 | 4.28 | 2.14 |
| EE | 2.44 | 4.88 | 2.44 |
| FF | 2.71 | 5.42 | 2.71 |
| GG | 2.94 | 5.88 | 2.94 |
| HH | 3.12 | 6.24 | 3.12 |
| II | 3.26 | 6.52 | 3.26 |
| JJ | 3.37 | 6.74 | 3.37 |
| KK | 3.43 | 6.86 | 3.43 |
| LL (Roll 82) | 3.45 | 6.90 | 3.45 |

Table 1 illustrates the difference in elevation between corresponding portions of the edges AD and BC in a typical assembly as described in this invention. In this example, the distance between the pivot roll 32 and cooling roll 184 is 91 feet so that the forming section 22 between the roll 32 and forming roll 82 is 45½ feet. The mounting assemblies 88 and 90 are positioned along longitudinal radii of curvature that correspond to edge AD and BC longitudinal radii of curvatures of 3,600 inches (91.46 meters), and 1,800 inches (45.73 meters), respectively. Positions AA through LL represent 3½ foot spacing of forming rolls in the forming section 22. As illustrated in FIG. 13, sag, h, is the distance the glass edge is positioned below the chord of the circles defined longitudinal radii $R_L$ and $r_L$. As can be seen, the maximum elevational differential, Δh, is at point LL (roll 82). The difference in elevation between the mounting assemblies 88 and 90 for each forming roll would follow a similar but not identical progession. If the roll spacing in the quench station 24 is the same as the roll spacing for the forming station 22, as illustrated in FIG. 13 and Table 1, then the elevation differential between the corresponding opposing glass edges on each roll would be the same as in Table 1, but in reverse order. In other words, the elevation differential, Δh would decrease from 3.45 inches at the roll 82 to 0 inches at the roll 184.

As stated earlier, the longitudinal curves are continued through the quench section 24. The relative difference of elevation between the mounting assemblies 152 and 154 of the quench rolls 148 depends on the roll spacing.

Figure 15:
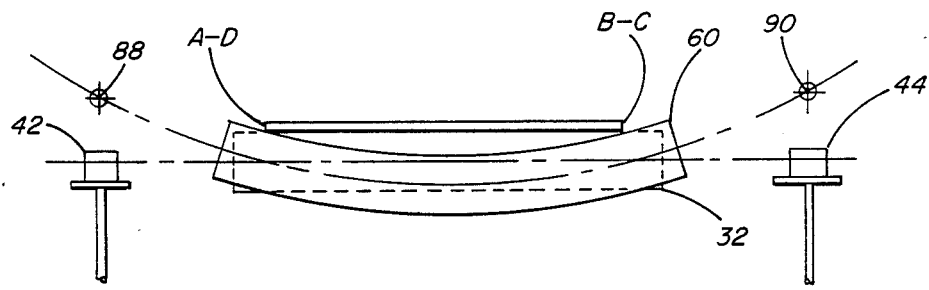
FIG. 15 is a view along line 15—15 of FIG. 1 showing the pivot roll and first forming roll.

It should be noted that mounting assemblies 42 and 44 of the pivot roll 32 are not on the same arcuate path as the mounting assemblies 88 and 90 due to the transverse curvature of the forming rolls. FIG. 15 illustrates a view of the glass sheet ABCD as it passes from the pivot roll 32 to forming roll 60. As illustrated, the elevation of each roll must be such as to allow the glass sheet ABCD to pass smoothly over the pivot roll 32 and onto the roll 60. If the pivot roll 32 were lower, the edges AD and BC would bump into the roll 60. If the pivot roll 32 were higher, the glass sheet ABCD would drop a distance as it passes from pivot roll 32 to roll 60.

Although the rolls used in the invention as discussed are the type taught in U.S. Pat. No. 4,311,509 to Reader et al., rolls of the type disclosed in U.S. Pat. No. 4,139,359 to Johnson et al., can also be used with minor modification. In addition, cylindrical rolls can be used instead of curved forming rolls. The resulting formed glass sheet will be a surface section of a cone, i.e., no transverse curvature and varying longitudinal curvature in the transverse direction.

It should be understood that the specific embodiments of this invention, along with its noted modifications, disclosed and described, are presented for the purpose of explanation and illustration and are not intended to limit the invention, the scope of which is defined by the following claims.

I claim:

1. An apparatus for shaping heat softened glass sheets into a configuration having a longitudinal radius of curvature that varies in a direction transverse to the glass sheet, the apparatus including a roll forming station comprising:

a first traversely extending reference roll;

a first series of longitudinally spaced and transversely extending forming rolls adjacent and downstream from said first reference roll;

means to mount a first portion of said first series of forming rolls along a first continuous arcuate path defining a first longitudinal radius of curvature and a second portion of said first series of forming rolls along a second continuous arcuate path defining a second longitudinal radius of curvature, wherein said first and second longitudinal radii are selected such that said first series of forming rolls defines a curved path having a longitudinal radius of curvature that varies in a direction from said first portion to said second portion of said first series of forming rolls; and means to position said reference roll such that a first portion of said reference roll is positioned along said first longitudinal radius and a second portion of said reference roll is positioned along said second longitudinal radius.

2. The apparatus of claim 1 wherein said means to mount is a first means to mount and wherein said forming station further includes:

a second series of longitudinally spaced and transversely extending forming rolls located downstream from said first series of forming rolls second means to mount first and second portions of said second series of forming rolls along an extension of said first and second longitudinal radii, respectively, defined by said first and second portions of said first series of forming rolls;

a set of upper forming rolls overlaying said second series of forming rolls and having a complementary overlying shape; and third means to mount first and second portions of said upper forming rolls above said second series of forming rolls at a distance slightly greater than the thickness of said glass sheet to be moved therebetween.

3. The apparatus of claim 2 further including:

a series of support rolls downstream from said second series of forming rolls; and fourth means to mount first and second portions of said series of support rolls along an extension of said first and second longitudinal radii, respectively, of said second series of forming rolls.

4. The apparatus of claim 3 further including a quenching station downstream of said second series of forming rolls with means for quenching opposing faces of a glass sheet to be moved therethrough.

5. The apparatus of claim 4 wherein quenching station and said series of support rolls are located at the same location downstream from said second series of forming rolls.

6. The apparatus of claim 3 wherein said first series of forming rolls, said second series of forming rolls, and said series of support rolls are cylindrical rolls.

7. The apparatus of claim 3 wherein said first series of forming rolls, said second series of forming rolls, and said series of support rolls have a concave upward transverse curvature.

8. The apparatus of claim 3 wherein said first, second and fourth means to mount includes pairs of first and second mounting assemblies, associated with first and second ends of said first series of forming rolls, said second series of forming rolls, and said series of support rolls, mounted to maintain said first and second portions of each of said first series of forming rolls, said second series of forming rolls and said series of support rolls at different relative vertical elevations along said first and second longitudinal radii.

9. The apparatus of claim 8 wherein said longitudinally curved path has a lowest point at a forming roll in said second series of forming rolls furthest downstream from said first series of forming rolls.

10. The apparatus of claim 9 wherein said longitudinally curved path formed by said first series of forming rolls defines a concave upward arcuate path.

11. The apparatus of claim 10 wherein said reference roll is a horizontally traversing cylindrical roll.

12. The apparatus of claim 11 wherein said first series of forming rolls, said second series of forming rolls and said series of support rolls have a concave upward transverse curvature.

13. The apparatus of claim 12 further including a series of transversely extending cylindrical conveyor rolls alternating with said first series of forming rolls, longitudinally spaced from and aligned with said first cylindrical roll to form a transversely flat path of support for said glass sheets, said flat path intersecting with said longitudinally curved path with said flat path support at a higher elevation than a major portion of said curved path in an upstream portion of said forming station and said flat path supported at a lower elevation than a majority of said curved path at the downstream portion, so that support for said glass sheet is gradually transferred from said conveying rolls to said first series of forming rolls as said glass sheet is moved downstream and sags into conformity with said first series of forming rolls.

14. A method of shading a heat softened glass sheet to longitudinal radii of curvature that varies in a direction transverse to the glass sheet comprising:

mounting each of a series of longitudinally spaced and transversely extending forming rolls such that a first portion of each of said rolls is positioned along a first continuous arcuate path defining a first longitudinal radius of curvature and a second portion of each of said rolls is positioned along a second continuous arcuate path defining a second longitudinal radius of curvature, wherein said first and second longitudinal radii are selected such that said series of forming rolls defines a curved path having longitudinal radii of curvature that varies in a direction from said first portion to said second portion of said series of forming rolls; and conveying said heat softened glass sheet over said series of rolls to shape said sheet along said curved path.

* * * * *